3,135,754
PURINE DERIVATIVES
George H. Hitchings, Tuckahoe, and Gertrude B. Elion, Bronxville, N.Y., assignors to Burroughs Wellcome & Co. (U.S.A.) Inc., Tuckahoe, N.Y., a corporation of New York
No Drawing. Filed Aug. 9, 1962, Ser. No. 215,774
5 Claims. (Cl. 260—252)

The present invention relates to a group of quine derivatives, more particularly to 6-pyrimidyl and 6-purinyl mercaptopurines, containing at least one purine moiety. More particularly the invention comprises a compound selected from the group consisting of

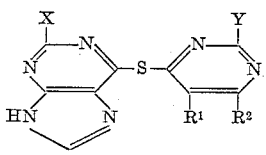

wherein X is selected from the class consisting of hydrogen and amino and Y is selected from the class consisting of hydrogen and hydroxyl and $R^1$ and $R^2$ are each hydrogen and both together are —N=CH—NH—.

The new substances are useful for their inhibitory effects on certain pathogenic bacteria for which adequate control measures do not presently exist. They are especially valuable by reason of the synergistic action which is exhibited on infectious and pathogenic organisms when they are used in combination with a sulfonamide or other antagonists of p-aminobenzoic acid such as diaminodiphenylsulfone (DDS). This is illustrated below (Table I) wherein it is shown that combinations of the new compositions with DDS produce strong inhibitions of Proteus vulgaris (strain 49210 I) at concentrations which, when the drugs are used singly, are non-inhibitory. These combinations may be further combined with antibiotics to form antibacterial preparations for topical use in various ways which will be apparent to those versed in the art.

The compounds are also active against transplantable rodent tumors such as Adenocarcinoma 755.

The new substances are formed by the reaction of a heterocyclic halide with an heterocyclic mercaptan according to the equation:

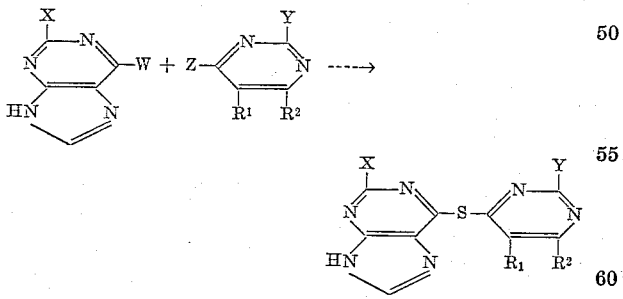

wherein X and Y, $R^1$ and $R^2$ have the values previously assigned and W and Z are selected from the groups consisting of the mercapto group on the one hand and chlorine, bromine and iodine on the other, one being selected from each group. The manner in which these reactions are carried out is illustrated in the examples below. Obviously, the conditions may be varied somewhat in detail e.g. solvent, time and temperature and the examples given are intended to be illustrative only. In practice, the usual solvents are those of high dielectric constant such as water, dimethyl formamide and dimethyl sulfoxide. All of these permit the reaction to be run at about 100°. In principle these reactions should indeed proceed more rapidly in solvents of lower dielectric constants, but since such substances are poorer solvents for the purines they are not practically useful. The course of the reaction can be followed by removing aliquots periodically and examining their ultra violet absorption spectra, since the spectra of the products are quite different from the spectra of the starting materials.

TABLE 1

| Compound, 10 γ/ml. | Quantities in gamma per ml. | Percent Inhibition |
|---|---|---|
|  | DDS 4/ml | 15 |
|  | DDS 8/ml | 25 |
|  | DDS 16/ml | 55 |
|  | DDS 4/ml |  |
| Example 1 | DDS 4/ml | 64 |
| Example 2 | DDS 4/ml | 54 |
| Example 3 | DDS 4/ml | 59 |
| Example 4 | DDS 4/ml | 81 |

Example 1

6,6-BIS PURINYL SULFIDE

A solution of 25 g. of 6-iodopurine and 16.8 g. of 6-mercaptopurine hydrate in 100 ml. of 2 N sodium hydroxide was heated on the steam bath for 24 hours. The reaction mixture was cooled and neutralized with acetic acid. The yellow precipitate of 6,6-bis-purinyl sulfide dihydrate (22 g.) was collected, washed with water and dried in a vacuum desiccator. The U.V. absorption spectrum showed λ max.=275, 308 mμ at pH 1, λ max.=285, 312 mμ at pH 11.

Example 2

6-(4'-PYRIMIDYL)MERCAPTOPURINE

A solution of 2.5 g. of 6-iodopurine and 1.12 g. of 4-mercaptopyrimidine in 10 ml. of 2 N sodium hydroxide was heated on the steam bath for 24 hours. The reaction mixture was then treated as in Example 1. The 6-(4'-pyridimyl)-mercaptopurine, M.P. 184–185° dec., has an U.V. spectrum with λ max.=273, 300 mμ at pH 1, λ max.=280, 305 mμ at pH 11.

Example 3

6-(2'-AMINO-6'-PURINYL)MERCAPTOPURINE

A solution of 7.3 g. of 6-thioguanine and 10 g. of 6-iodopurine in 60 ml. of 2 N sodium hydroxide was treated as in Example 1. The 6-(2'-amino-6'-purinyl)mercaptopurine did not melt >325°. Its U.V. absorption spectrum showed λ max.=270, 302, 330 mμ at pH 11, λ max.=287, 328 mμ at pH 11.

Example 4

6-(2'-HYDROXY-4'-PYRIMIDYL)MERCAPTOPURINE

A solution of 10 g. of 6-iodopurine and 5.12 g. of 4-thiouracil in 60 ml. of 2 N sodium hydroxide was treated as in Example 1. The product, 6-(2'-hydroxy-4'-pyrimidyl)mercaptopurine, has a U.V. spectrum with λ max.=320 mμ at pH 1 and λ max.=310 at pH 11.

This application is a continuation-in-part of application 16,203 filed March 21, 1960, which has matured into Patent No. 3,056,785.

What we claim is:
1. A compound of the formula

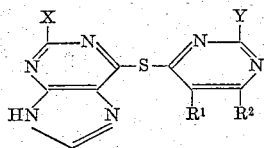

wherein X is selected from the class consisting of hydrogen and amino and Y is selected from the class consisting of hydrogen and hydroxyl and $R^1$ and $R^2$ are each hydrogen and both together are —N=CH—NH—.

2. 6,6-bis purinyl sulfide.
3. 6-(4'-pyridimyl)mercaptopurine.
4. 6-(2'-amino-6'-purinyl)mercaptopurine.
5. 6-(2'-hydroxy-4'-pyrimidyl)mercaptopurine.

No references cited.

UNITED STATES PATENT OFFICE
CERTIFICATE OF CORRECTION

Patent No. 3,135,754                June 2, 1964

George H. Hitchings et al.

It is hereby certified that error appears in the above numbered patent requiring correction and that the said Letters Patent should read as corrected below.

Column 1, line 10, for "quine" read -- purine --.

Signed and sealed this 13th day of October 1964.

(SEAL)
Attest:

ERNEST W. SWIDER
Attesting Officer

EDWARD J. BRENNER
Commissioner of Patents